United States Patent [19]
Boyama

[11] 3,997,833
[45] Dec. 14, 1976

[54] VOLTAGE REGULATOR FOR A MAGNETO AC GENERATOR

[75] Inventor: Kimihiro Boyama, Numazu, Japan

[73] Assignee: Kokusan Denki Co., Ltd., Numazu, Japan

[22] Filed: June 19, 1975

[21] Appl. No.: 588,134

[30] Foreign Application Priority Data

June 24, 1974 Japan .................. 49-73178[U]

[52] U.S. Cl. .................. 322/7; 317/33 UR; 322/24; 322/91; 323/39
[51] Int. Cl.² .................. H02J 7/24
[58] Field of Search .................. 317/16, 31, 33 UR; 322/7, 8, 22, 24, 28, 89, 90, 91; 323/20, 22 SC, 36, 39

[56] References Cited
UNITED STATES PATENTS

| | | | |
|---|---|---|---|
| 3,001,100 | 9/1961 | Schuh et al. | 317/31 |
| 3,270,268 | 8/1966 | Carmichael et al. | 322/91 X |
| 3,443,200 | 5/1969 | Kuhn | 322/24 |
| 3,500,394 | 3/1970 | Egesdal | 317/31 X |
| 3,716,774 | 2/1973 | Lace | 322/28 X |
| 3,852,653 | 12/1974 | Kuroda et al. | 322/28 X |
| 3,921,057 | 11/1975 | Naoi et al. | 322/28 X |

Primary Examiner—A. D. Pellinen
Attorney, Agent, or Firm—Woodling, Krost, Granger & Rust

[57] ABSTRACT

A voltage regulator for a magneto AC generator comprising a battery charging generator coil and a loading generator coil, said voltage regulator comprising a first voltage divider to detect a voltage proportional to a terminal voltage of a battery; a second voltage divider to detect a voltage proportional to an output voltage of the loading generator coil; and a controlled rectifier arranged to short-circuit the battery charging generator coil and adapted to be conductive when either of the voltages detected by the first and second voltage dividers is greater than a predetermined value, the battery charging and loading generator coils being arranged to be magnetically bonded with each other.

7 Claims, 1 Drawing Figure

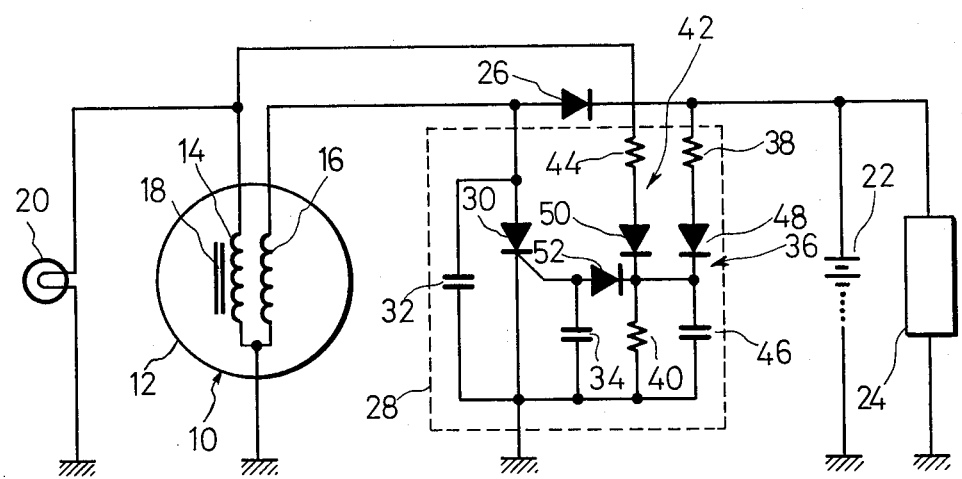

VOLTAGE REGULATOR FOR A MAGNETO AC GENERATOR

BACKGROUND OF THE INVENTION

In general, a magneto AC generator for a vehicle includes a generator coil to operate loads such as lamps and a generator coil to supply a charging current through a rectifier mainly to a battery on the vehicle. Conventionally, such a magneto AC generator comprises a voltage regulator including controlled rectifiers arranged to be connected in parallel to the loading and battery charging generator coils, respectively, which serve to short-circuit the corresponding generator coil when the respective generator coils have the output voltages generated over a predetermined value whereby the output voltage are regulated. Such a voltage regulator, however, has the disadvantage in that the construction is very complicated because of two controlled rectifiers being required.

SUMMARY OF THE INVENTION

Accordingly, it is a principal object of the present invention to provide a voltage regulator for a magneto AC generator adapted to effectively control both of a loading generator coil and a battery charging generator coil with a single controlled rectifier even though a battery has a lowered terminal voltage developed thereacross.

In accordance with the present invention, there is provided a voltage regulator for a magneto AC generator comprising a battery charging generator coil to charge a battery through a rectifier and a loading generator coil to drive loads, said voltage regulator comprising a first voltage divider to detect a voltage proportional to a terminal voltage of said battery; a second voltage divider to detect a voltage proportional to an output voltage of said loading generator coil; a controlled rectifier arranged to shortcircuit said battery charging generator coil; and means to cause conduction of said controlled rectifier when either of the voltages detected by said first and second voltage dividers is greater than a predetermined value, said battery charging and loading generator coils being arranged to be magnetically bonded with each other.

BRIEF DESCRIPTION OF THE DRAWING

The above and other objects and features of the present invention will be apparent from the description of a preferred embodiment of the present invention taken with reference to the accompanying drawing in which; a single figure is a schematic diagram of a generator-load system incorporating a voltage regulator according to the present invention.

DETAILED DESCRIPTION OF THE PREFERRED EMBODIMENT

Referring now to a single figure, there is shown a magneto AC generator 10 which comprises a magnet rotor (not shown) including a plurality of magnets disposed in a circumferential arrangement and a stator 12 including a loading generator coil 14 and a battery charging generator coil 16 which are wound around a common iron core 18 so as to be magnetically bonded with each other. One of the ends of the generator coils 14 and 16 may be grounded. A lamp 20 may be connected to the other or output end of the loading generator coil 14, while a battery 22 and a DC load 24 such as an ignition coil may be connected in parallel through a rectifier 26 to the other or output end of the battery charging generator coil 16. The lamp 20, the battery 22 and the DC load 24 may have respective one ends grounded.

A voltage regulator 28 is provided for the magneto AC generator 10 and comprises a controlled rectifier such as a thyristor 30 connected in parallel to the other end of the battery charging generator coil 16. Capacitances 32 and 34 which may be connected across the anode and cathode and across the gate and cathode of the thyristor 30, respectively, serve to prevent the thyristor from a surge voltage applied thereto. It will be understood that they may be omitted in some cases.

The voltage regulator 28 also comprises a first voltage divider 36 which includes a resistance 38 having one end connected to the non-grounded end of the battery and another resistance 40 having one end connected to the other end of the resistance 38 and the other end grounded so that it serves to detect a voltage proportional to the terminal voltage of the battery 22. The voltage regulator 28 further comprises a second voltage divider 42 which includes a resistance 44 having one end connected to the non-grounded or output end of the loading generator coil 14 and the afore-mentioned resistance 40 having the one end also connected to the other end of the resistance 44. A capacitance 46 may be connected in parallel to the resistance 40 and serves to delay increase of the output voltages of the voltage dividers 36 and 42 relative to that of the output voltage of the battery charging generator coil 16 for the later-mentioned reason. A diode 48 may be inserted between the resistances 38 and 40 so that the capacitance 46 is prevented from its discharge through the resistance 38 and the battery 22. Similarly, a diode 50 may be inserted between the resistances 44 and 40 so that the capacitance 46 is prevented from its discharge through the resistance 44 and the lamp 20 and it also serves to prevent a current from the battery 22 through the resistances 38 and 44 to the loading generator coil 14. Although in the illustrated embodiment the resistance 40 may be commonly used for the first and second voltage dividers 36 and 42, it will be noted that they may comprise respective two series resistances so that a dividing terminal is common to both of them.

Means to cause conduction of the thyristor 30 when either of the voltages detected by the first and second voltage dividers 36 and 42 is greater than a predetermined value, may comprise a Zener diode 52 having the cathode connected to the junction between the diodes 48 and 50 and the resistance 40 and having the anode connected to the gate of the thyristor 30.

In operation, as the revolution number of the generator 10 increases or as the battery proceeds to be charged, the resistance 40 of the first and second voltage dividers 36 and 42 has an increased voltage developed thereacross until it reaches the sum of the Zener voltage of the Zener diode 52 and the gate turn-on voltage of the thyristor 30. Then, the thyristor is caused to be conductive and short-circuits the output of the battery charging generator coil 16 during the period of a given phase. It will be understood that the battery can have a terminal voltage kept substantially constant with the Zener diode having a given Zener voltage and with the voltage dividers having a given dividing ratio. The armature reaction on the battery charging generator coil 16 when short-circuited affects the output of the loading generator coil 14 so that it is reduced, because of the battery charging generator coil 16 magnetically bonded with the loading generator coil 14. Thus, the lamp 20 can be prevented from high voltage applied thereacross. It should be noted that since the output voltage of the loading generator coil 14 as well as the terminal voltage of the battery 22 are detected by the respective voltage dividers, the battery charging generator coil 16 can be short-circuited when the output voltage of the loading generator coil 14 becomes abruptly higher due to rapid increase in the revolution number of the generator 10 even under the condition that the terminal voltage of the battery 22 is lower than the predetermined value. Thus, even when the terminal voltage of the battery 22 is lower than the predetermined value, the lamp 20 can be effectively prevented from application of an overvoltage thereto. This fact is true of the cases in which the relatively larger intermittent DC load 24 is operated and in which the terminal voltage of the battery is delayed to be restored after removal of the intermittent load. Similarly, even if the battery should be removed from the circuit, the lamp 20 can be prevented from burning out.

As afore-mentioned, the phase of the voltage across the resistance 40 of the voltage dividers 36 and 42 is delayed by the capacitance 46 arranged in parallel thereto and as a result the thyristor 30 can initially be conducted for a relatively smaller conductive angle and gradually increase with the output voltage of the battery charging generator coil 16. Thus, the thyristor 30 is prevented from starting to be conducted for a larger angle so that the lamp 20 is held from flickering.

While one preferred embodiment of the present invention has been illustrated and described with reference to the accompanying drawing, it will be apparent to those skilled in the art that various changes and modifications may be made without departing from the spirit and scope of the present invention, which is intended to be defined only by the appended claims.

What is claimed is:

1. A voltage regulator for a magneto AC generator comprising a battery charging generator coil to charge a battery through a rectifier and a loading generator coil to drive loads, said voltage regulator comprising a first voltage divider to detect a voltage proportional to a terminal voltage of said battery; a second voltage divider to detect a voltage proportional to an output voltage of said loading generator coil; a controlled rectifier arranged to short-circuit said battery charging generator coil; and means to cause conduction of said controlled rectifier when either of the voltages detected by said first and second voltage dividers is over a predetermined value, said battery charging and loading generator coils being arranged to be magnetically bonded with each other.

2. A voltage regulator as set forth in claim 1, wherein said first and second voltage dividers comprise a common resistance.

3. A voltage regulator as set forth in claim 2, wherein said common resistance has a phase delaying capacitance connected in parallel thereto.

4. A voltage regulator as set forth in claim 3, said voltage dividers each comprise a diode arranged to prevent said capacitance from discharge through said voltage dividers.

5. A voltage regulator as set forth in claim 1, wherein said means to cause conduction of said controlled rectifier comprises a Zener diode having the cathode connected to both of the outputs of said voltage dividers and the anode connected to the control electrode of said controlled rectifier.

6. A voltage regulator as set forth in claim 1, wherein said controlled rectifier has capacitances connected between the anode and cathode and between the control electrode and cathode of said controlled rectifier, respectively.

7. A voltage regulator as set forth in claim 1, wherein said battery charging and loading generator coils are wound around a common iron core.

* * * * *